Oct. 6, 1953    R. NEWTON    2,654,248
LUBRICATED GAS METER
Filed Dec. 23, 1947    3 Sheets-Sheet 1
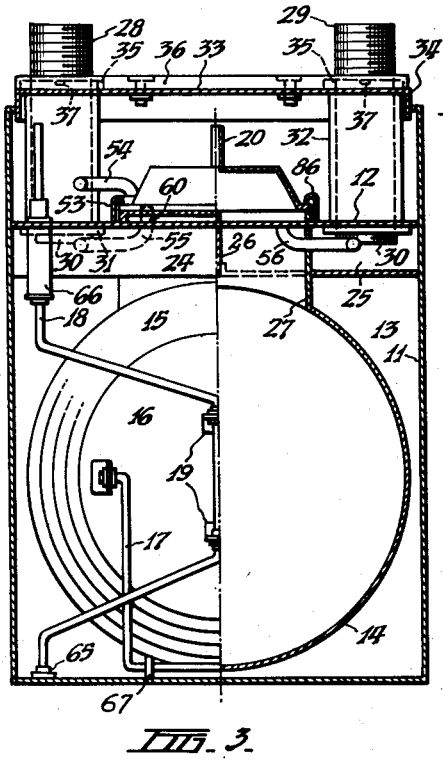
FIG. 3.
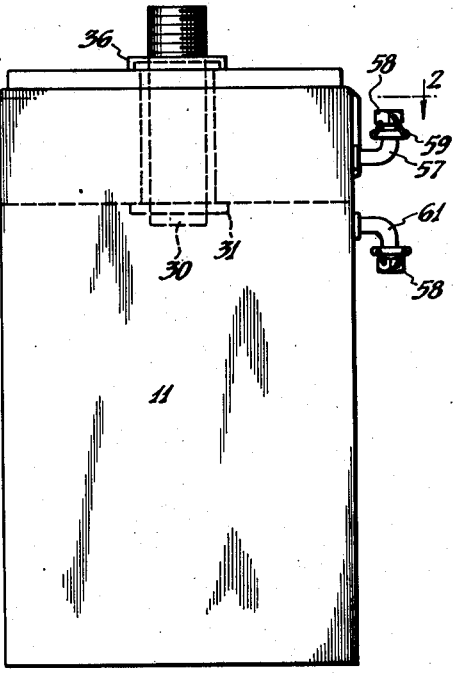
FIG. 1.
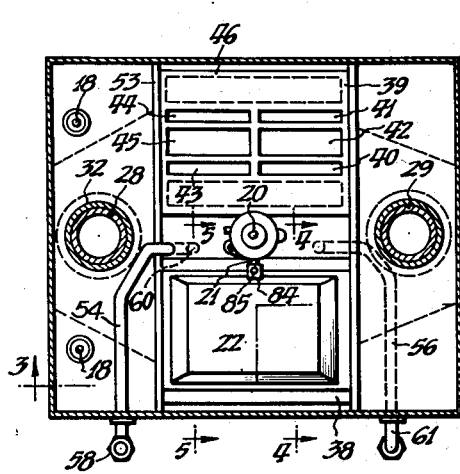
FIG. 2.
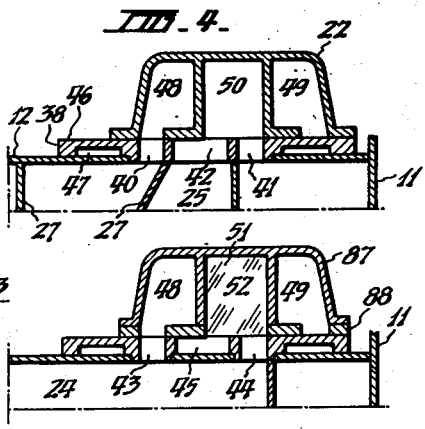
FIG. 4.
FIG. 5.
Robert Newton
Inventor
By Arnold Robinson
ATTORNEY Oct. 6, 1953          R. NEWTON          2,654,248
LUBRICATED GAS METER
Filed Dec. 23, 1947          3 Sheets-Sheet 2
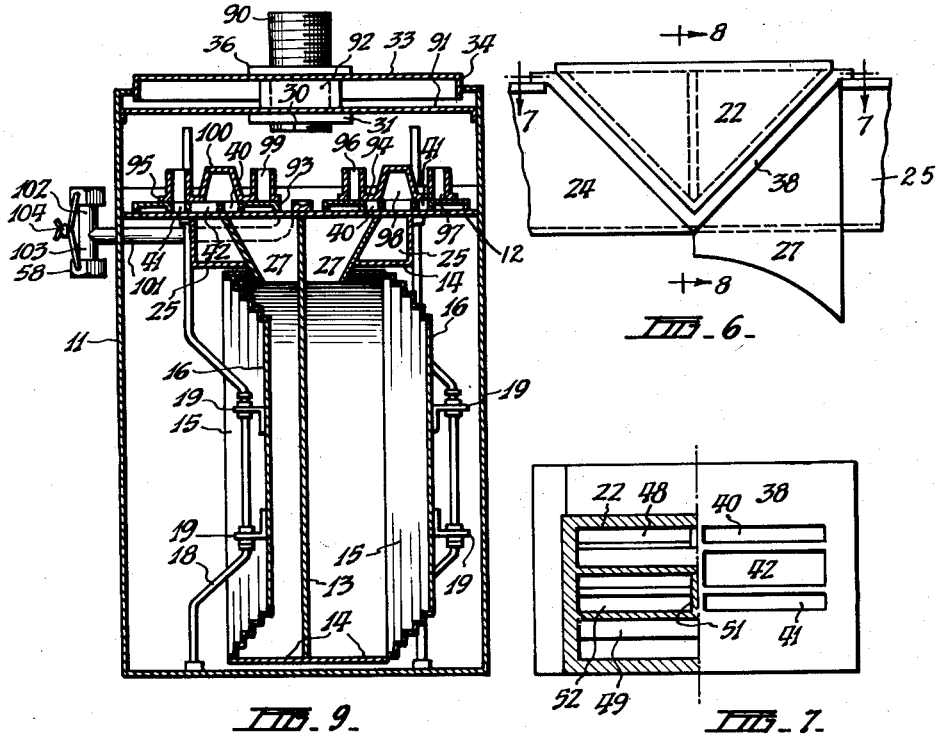
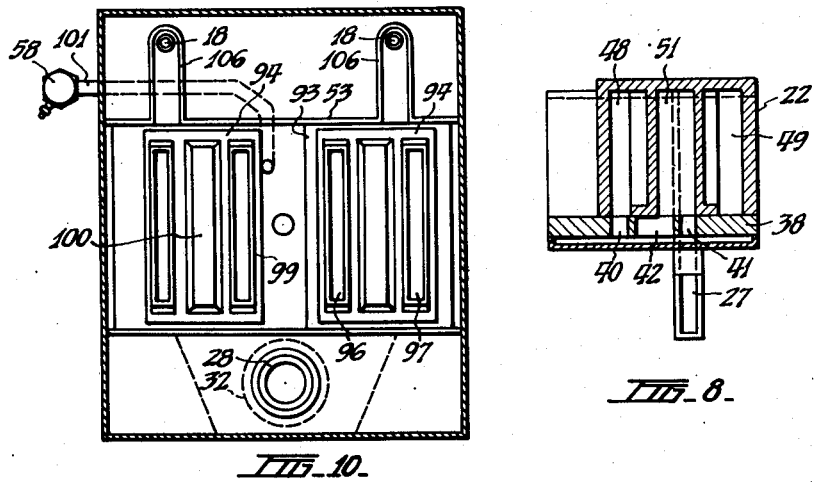
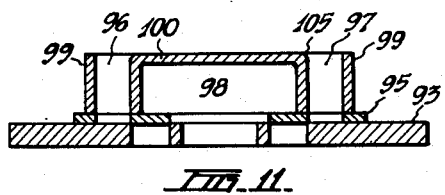
Robert Newton
         Inventor
By Arnold Robinson
         Attorney

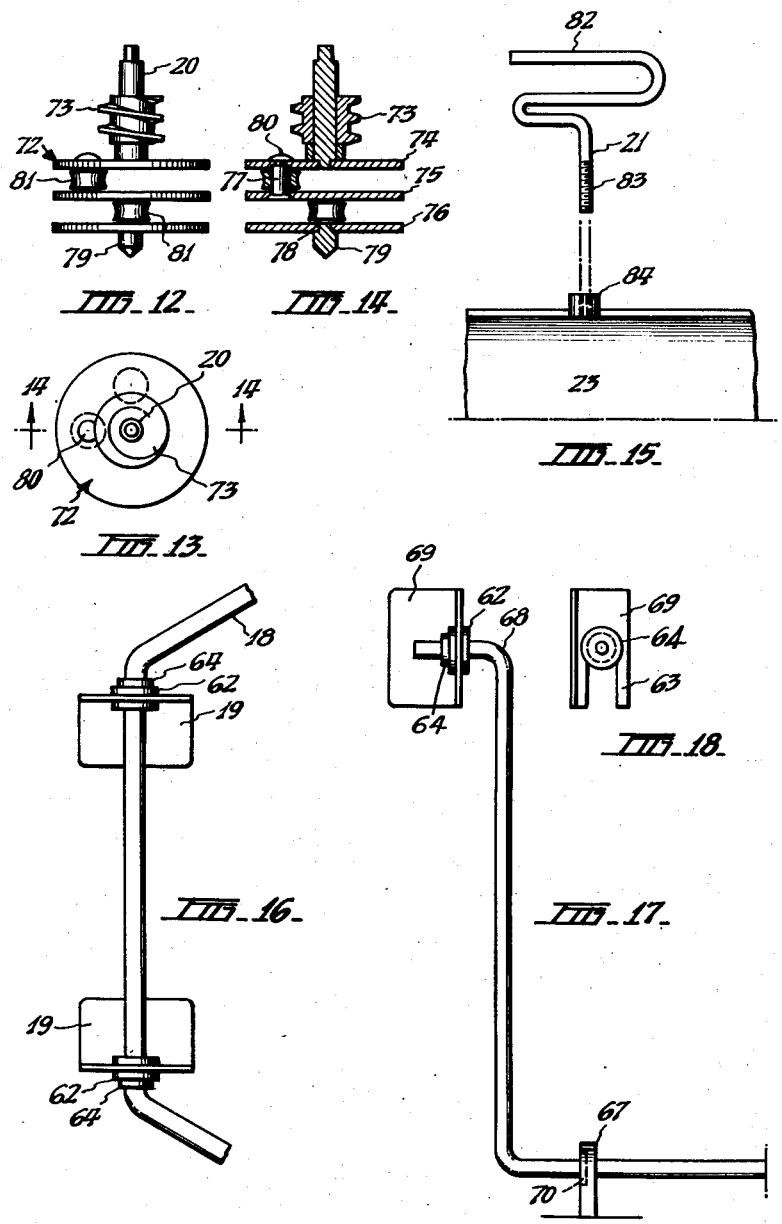

Patented Oct. 6, 1953

2,654,248

UNITED STATES PATENT OFFICE 2,654,248

LUBRICATED GAS METER

Robert Newton, East Melbourne, Victoria, Australia

Application December 23, 1947, Serial No. 793,471
In Australia January 20, 1947

15 Claims. (Cl. 73—274)

This invention relates to improvements in gas meters and it refers particularly to dry gas meters of either the closed top or open top type.

The principal object of the invention is to provide a dry gas meter having means for reducing the friction of the operating parts whereby the absorption of the gas pressure will be materially reduced. A dependant object is to provide extremely simple yet effective means for lubricating and/or cleaning the valves of gas meters, such lubrication and/or cleaning being achieved without disconnection or displacement of said gas meters.

A further object is to provide means for lubricating the valves of gas meters in such manner that the escape of lubricant to the lower chambers will be prevented. A still further object of the invention is to provide a construction of valve, for use in gas meters, which will permit lubrication and/or cleaning of the valves to be effected without disconnection of the meter. A subsidiary object is to provide an improved design of valve which will have an increased capacity in relation to its size and will yet be relatively light in effective weight and of compact construction.

Another object is to provide a simplified construction of crank, conducive to economy of production, which will permit reduction of the friction of operation thereof. Other objects are to effect reduction of friction in the connections of the motion wires and of the side rods to the diaphragms, and to provide valve operating rods of economical construction which will be conducive to the reduction of friction during operation of the meter, and also enable adjustment of the valves to be readily effected.

With these and other objects in view I provide a dry gas meter having means for reducing the friction of the operating ports, including a reservoir located about the valve gratings, means for feeding lubricant to the reservoir from the outside of the meter casing, means for maintaining the level of the lubricant in the reservoir at a suitable height to ensure that there is an adequate supply of lubricant to the bearing surfaces of the valves, and valve covers associated with the valve gratings, the valve covers being adapted to completely surround the ports in the valve gratings at all positions of the travel of the valve covers so as to prevent escape of lubricant through the grating ports.

The crank pins are provided with friction reducing rollers adapted to engage the ends of valve-operating rods connected to the valve covers, and the motion wires and side rods are provided with friction-reducing rollers adapted to engage with brackets connected to the diaphragms.

In order that the invention will be clearly understood reference will now be made to the accompanying sheets of illustrative drawings depicting both closed top and open top types of dry gas meters incorporating the several features of this invention. In these drawings:

Fig. 1 is a side elevation of a dry gas meter;

Fig. 2 shows a horizontal cross-section, taken on the line 2—2 of Fig. 1, of a closed top gas meter—the upper arms, tangent and index operating mechanism being omitted for clarity of illustration;

Fig. 3 is a combination vertical section of a gas meter on the line and in the direction indicated by the arrows 3—3 of Fig. 2;

Figs. 4 and 5 illustrate the arrangement of the ports in the valve gratings and valve covers, the two views being cross-sections through a valve grating and valve cover at the locations of the lines and in the directions indicated by the arrows 4—4 and 5—5, respectively, of Fig. 2;

Fig. 6 is an end view of a trough-shaped valve constructed according to my invention;

Fig. 7 is a horizontal view, partly in section through the valve cover and partly in plan of the valve grating, on the line 7—7 of Fig. 6;

Fig. 8 is a vertical longitudinal section of the valve cover and valve grating in the direction of the arrows 8—8 of Fig. 6;

Fig. 9 illustrated a vertical transverse section of an open top gas meter, the index and index operating mechanism being omitted for clarity of illustration;

Fig. 10 shows a horizontal section of the gas meter illustrated in Fig. 9, the section being taken above the valve plate;

Fig. 11 illustrates a longitudinal section of a modified construction of valve cover for use with an open top type of gas meter;

Fig. 12 is a front elevation of the crank constructed according to the invention;

Fig. 13 shows the crank in plan view;

Fig. 14 is a vertical section through one of the crank pins;

Fig. 15 illustrates the valve operating rod and one method of adjustably connecting it to a valve cover;

Fig. 16 shows the side rods, with the friction-reducing rollers mounted thereon, connected to brackets on the diaphragm;

Fig. 17 is a half view of a motion wire showing the method of mounting it and the manner in which it is connected to a diaphragm; and Fig. 18 is an end view of a motion wire bracket.

This bracket is preferably of the same construction as the side rod brackets.

In these drawings the Figs. 1, 2, 3, 9 and 10 are drawn to smaller scale than the remainder of the figures.

Reference is made initially to the closed top dry gas meter illustrated generally in and by Figs. 1, 2 and 3 and to the construction of valve grating and valve cover illustrated in Figs. 4 and 5.

The closed top gas meter constructed according to my invention is basically of conventional design. It has a casing 11; a valve plate 12 mounted therein so as to divide the meter into upper and lower compartments; a vertical transverse division plate 13 separating the lower compartment into two sections; diaphragm rims 14 secured to the division plate; and flexible diaphragms 15 fastened to the outer ends of the rims, said diaphragms having rigid discs 16 which are restrained against lateral movement by motion wires 17 and connected to side rods 18 by means of brackets 19 of any suitable design. The upper ends of the side rods 18 are connected through a suitable linkage mechanism of any conventional type to a crank shaft 20 which is in turn connected by valve operating rods 21 to the valve covers 22 and 23. The drive from the crank shaft to the index mechanism is of conventional design and arrangement.

Fastened to the underside of the valve plate 12 are inlet and outlet gas passageways 24 and 25, respectively. These passageways are separated and sealed from each other by a longitudinal vertical plate 26 and two gas conduits 27 pass vertically through the outlet passageway 25, being connected to the diaphragm rims 14 so as to permit the flow of gas through to the inner diaphragm chambers.

Inlet and outlet gas pipes 28 and 29, respectively, are connected to the gas passageways 24 and 25 and they extend upwardly through the top of the meter casing 11. These gas pipes are formed at their lower ends with screw threaded necks 30 adapted to be screwed into nuts 31 which are securely fastened to the valve plate 12 the connection between the necks 30 and the nuts 31 being sealed against the escape of gas by any suitable means. A collar or tubular spacing member 32 is located about each of the gas pipes 28 and 29. These collars provide supports for the top plate 33 of the casing 11 when said top plate is clamped securely in position. For ease of assembly I prefer to make the casing top plate with a peripheral flange 34 adapted to slidably fit within an opening at the top of the meter casing, and the inlet and outlet gas pipes 28 and 29 are provided with fastenings 35 adapted to bear upon the outer surface of the top plate 33. When the fastenings 35 are clamped down upon the top plate 33 the peripheral flange of that plate slides vertically within the opening formed at the top of the casing 11 until the top plate rests upon the spacing members 32. The top plate is then sealed in position by running a seam of solder around the edge of its peripheral flange.

Should it be necessary, at any subsequent date, to gain access to the upper compartment of the meter for examination or testing purposes the inlet and outlet pipes may be conveniently detached and the top plate 33 of the casing removed by running off the solder seam around its periphery.

A bar 36 is fastened to the top of the meter casing so as to be adapted to lock the two fastenings 35 securely and non-rotationally in position. This locking bar 36 has near each of its opposite ends a counterbored opening through which fit the inlet and outlet gas pipes 28 and 29 and the lower, counterbored portion of each opening fits about one of the fastenings 35. Pins 37 are secured in the counterbored portions of the locking bar and they are adapted to engage in appropriately located recesses formed in the upper surfaces of the fastenings 35. A series of such recesses is provided in each of the fastenings so as to permit requisite fineness of adjustment. When the locking bar is fitted in place with the pins at the opposite ends engaged within appropriate recesses in the fastenings the said fastenings will be securely held against rotation. The locking bar is fixed in position and sealed by any suitable means, such as by screws passing therethrough and engaging in nuts secured to the underside of the casing top plate.

Fastened to the valve plate 12 are two valve gratings 38 and 39. Each of these valve gratings has an end port 40 to which the relative gas conduit 27 is connected, an opposite end port 41 leading to the outer diaphragm chamber and an intermediate port 42 connected to the outlet gas passageway 25. These three ports are disposed in longitudinal arrangement. An inlet port 43 is located at the side of the first end port 40 and a second inlet port 44 is provided alongside the second end port 41. These two inlet ports 43 and 44 are in direct communication with the inlet gas passageway 24. That portion of each of the valve gratings 38 and 39 between the two inlet ports 43 and 44 is blanked-off at 45 to prevent the flow of gas from either of the inlet ports 43 or 44 back to the inlet passageway 24. The end faces of the valve gratings are extended at 46 a substantial distance beyond the ends of the ports so as to provide bearing surfaces for the valve covers 22 and 23 for the full extent of their travel, and the undersides of these end extensions 46 are recessed at 47 to reduce the amount of metal in the grating.

The valve covers 22 and 23 which are associated with the valve gratings 38 and 39, respectively, are each formed with two opposite end ports 48 and 49 and an intermediate port 50 in longitudinal arrangement corresponding to the arrangement of the opposite end ports 40 and 41 and intermediate port 42 of the valve grating. Each of the outer ports 48 and 49 extends transversely across the valve cover from the one side bearing surface to the other, but the intermediate port 50 extends only part of that distance, there being a vertical partition 51 corresponding in position to the division between the intermediate port 42 and the blanked-off port 45 of each of the valve gratings, leaving a blank pocket 52.

When the valve covers are in the position shown in Figs. 4 and 5 with the intermediate cover port 50 straddling the outer end port 41 and the intermediate port 42 of the valve grating (when the pocket 52 straddles the port 44 and the blanked-off part 45) gas from the inlet gas passageway 24 passes upwardly through the inner inlet port 43 of the valve grating, transversely across the inner end port 48 of the valve cover and then down through the inner end port 40 of the valve grating and the conduit 27 associated therewith into the inner diaphragm chamber. Any gas which travels upwardly through the other inlet port 44 of the valve grating into the pocket 52 is prevented from flowing further by the partition 51 in the valve cover and the blanking plate 45 in the valve grating between the two inlet ports.

At the same time as the gas is flowing into the inner diaphragm chamber gas flows upwardly through the outer grating port 41, longitudinally through the intermediate cover port 50 and down through the outlet or intermediate port 42 of the valve grating and into the outlet gas passageway 25.

Two longitudinal walls 53 are fitted adjacent the sides of the valve gratings 38 and 39 so as to form a reservoir for oil or other suitable lubricant. These walls extend the full depth of the meter from the front plate to the back plate so that the valve gratings will be surrounded with lubricant. Three tubes 54, 55 and 56 are mounted within the front plate of the meter in such manner that their outer ends are located on the outside of the meter and their inner ends inside the meter. The first tube 54 is the lubricating tube and it is so located that its inner, downturned end is above the reservoir formed by the walls 53. The outer end of the lubricating tube is upturned at 57 and it is externally screw threaded to receive a sealing cap 58 of any suitable type. This cap is locked in position by means of a wire passing transversely through the top of it and through a lug 59 attached to the tube 54. A seal is applied to the ends of the wire to eliminate liability of undetected tampering.

The second tube 55 is the level-setting tube and it is fitted within the casing 11 so that it lies beneath the valve plate 12 with its inner end upturned at 60 so as to project a suitable distance through said valve plate. The height of the upturned end 60 regulates or controls the level of lubricant in the reservoir, as excess lubricant fed to the reservoir will drain through the level-setting tube 55. The inner end 60 extends slightly above the level of the top of the valve gratings 38 and 39. The outer end 61 of that tube is located directly beneath the end 57 of tube 54 and in horizontal alignment with the outer end of tube 56 and is downturned and provided with a sealing cap 58 similar to that on the lubricating tube 54 (Fig. 1). That cap is locked in position and sealed as heretofore described.

The third tube 56 is a drainage tube and it is also located beneath the valve plate 12 with its inner end upturned and connected to said valve plate. However, its inner end does not project upwardly above the level of the valve plate. The outer end of the drainage tube 56 is downturned as at 61 and provided with a sealing cap 58 locked and sealed in manner already described.

The detailed constructions of the side rods 18, motion wires 17, crankshaft 20 and valve-operating rods 21 are illustrated in Figs. 12 to 18, which will now be referred to in conjunction with Figs. 2 and 3.

The side rods 18 are connected to the discs 16 by means of the brackets 19, as already mentioned. In order to reduce frictional resistance within the gas meter each of the side rods is provided with a pair of grooved rollers 62 engaging in slots which are formed in the horizontal portions of the brackets 19. Collars 64 are fastened on the side rods 18 above and below the grooved rollers 62 so as to hold the diaphragm discs 16 in correct vertical position.

The lower end of each side rod 18 is held in a bearing bracket 65 mounted at the bottom of the meter casing 11 and the upper ends of said side rods extend upwardly through the valve plate 12, the openings in the valve plate being sealed against the escape of gas from the outer diaphragm chambers by means of suitable glands 66.

The motion wires 17 are mounted rotationally in brackets 67 secured to the bottom of the meter casing 11 and their upper ends are outturned at 68, having grooved rollers 62 rotationally mounted thereon. These grooved rollers are engaged in slots 63 formed in brackets 69 which are secured to the diaphragm discs 16, these brackets 69 being of the same construction as the brackets 19 to which the side rods 18 are connected. A collar 64 is fastened to each outturned end 68 of the motion wires 17 in order to restrain the rollers 62 and diaphragm discs 16 against lateral movement.

Each of the motion wires 17 has a collar 70 fastened at the opposite ends of its lower branch adjacent the lower bearing brackets 67. These lower collars 70 fit within recesses formed in those lower brackets so as to provide bearings of larger diameter for the motion wire, thereby reducing wear of the brackets 67 with consequent reduction of the internal friction of the gas meter.

The crankshaft 20 is mounted substantially mid-way between the valve gratings 38 and 39 in alignment with the longitudinal axes of the valve covers 22 and 23. At the lower end of the crankshaft is a crank 72, by means of which the motions of the diaphragms 15 and the valve covers 22 and 23 are synchronised, and above the crank is a worm 73 adapted to drive the index operating mechanism. The crank 72 is fabricated from a top disc 74, an intermediate disc 75, and a lower disc 76 which are secured in parallel spaced relationship by means of upper and lower crank pins 77 and 78, respectively. The top disc is rigidly fastened to the lower end of the crankshaft 20, as by brazing, and a crank bearing pin 79 is similarly fastened to the lower disc 76. Each of the crank pins 77 and 78 has one end securely and non-rotatably connected to the intermediate disc 75 and their opposite, or outer, ends are of slightly reduced size, being formed with flats adapted to fit neatly into appropriately shaped holes in the top and lower discs 74 and 76. Rotational displacement of the top and lower discs relative to the intermediate disc 75 is thereby prevented. The shoulders provided by the formation of the flats at the outer ends of the crank pins 77 and 78 ensure correct spacing of the three discs. Each crank pin is detachably fastened to the relative disc at its outer end by means of a screw 80 which is engaged in an axial tapped hole formed in the outer end of the said crank pin. A grooved roller 81 is rotatably mounted on each of the crank pins 77 and 78 prior to the assembly of the crank 72.

The rollers 81 of the crank 72 are adapted to engage within the ends of valve-operating rods 21 which are adjustably connected to the valve covers. As shown in Fig. 15 the valve-operating rods are made of wire of suitable gauge formed approximately in the shaft of a T, the cross-bar 82 being in the form of a U-shaped loop wherein the appropriate grooved roller 81 is fitted. The groove of the roller is of semi-circular shape to snugly fit the corss-sectional shape of the valve-operating rod. The leg 83 of the valve-operating rod is screw-threaded so as to engage in a tapped hole formed in a boss 84 which is formed integrally with the valve cover 22 or 23. Adjustment of the effective length of the valve-operating rod 21 is effected by rotating the rod relative to the valve cover.

This type of connection differs slightly from that shown in Fig. 2 which shows the leg 83 slidably fitted within the boss 84 and locked in adjusted position by means of a set-screw 85.

The valve covers 22 and 23 are guided in correct longitudinal paths during their reciprocatory movements and side play is restricted by the reservoir walls 53. In order to prevent lifting of the valve covers from the gratings 38 and 39 should the meter be inadvertently turned on its side or placed upside down during transport the upper edges of the walls 53 are downturned at 86 to within a short distance of the upper surface of the side edges of the valve covers. Should it be required at any time to re-grind the surface of the valve gratings 38 and 39 the walls 53 may be readily removed to permit that operation to be conveniently effected and then easily replaced in correct position.

The valve cover illustrated in longitudinal cross section by Fig. 4 is made completely of metal. In some instances it may be desired to manufacture the valve covers by moulding or forming the upper portions separately from the bearing surfaces. Such a construction is illustrated in Fig. 5 which shows the upper portion 87 secured to a separately-formed bearing surface member 88. The two parts 87 and 88 are secured together by any suitable means. Thus, the upper part 87 may be made in a suitable thermo-setting plastic or synthetic material and the bearing surface 88 made of the customary bearing metal, the two parts being secured together by means of an adhesive.

The valve covers may be made in the conventional "flat" shape, as already described, or they may be made of trough shape. When this is done the valve gratings are made in the form of a trough 38 such as the V-shaped trough illustrated in and by Figs. 6, 7 and 8. The trough extends downwardly in the inlet and outlet gas passageways 24 and 25 so that the gas flowing into the valve cover flows in a straight line without being constrained to turn upwardly, the only turn being a right-angular turn downwardly to flow into the diaphragm chambers. The grating ports are arranged in the manner set out in the preceding description, and they are referenced by the same numerals as heretofore employed. Similarly, the ports of the valve cover are disposed in the same arrangement in the trough-shaped valve as in the flat valve. The valve grating of Figs. 6, 7 and 8 is preferably provided with a lubricating arrangement (not shown) of the kind illustrated in Figs. 1–5, which establishes a lubricant reservoir around the valve grating with lubricant therein to flow into the trough and be worked over the entire valve seat during the operation of the valve.

What ever the shape of the valve—flat or trough-shaped—the side walls of the valve cover separating the two end ports from the intermediate port are made of relatively thin section so that the part of the end ports within the valve cover is of greater width than the openings in the bearing surfaces. As a result of this construction the height of the valve covers may be materially reduced whilst still maintaining the cross-sectional area of the end ports within the valve covers greater than the area of the openings in the bearing surfaces.

It is to be noted that the weight of the valve covers must be made sufficient to ensure that the valve covers will be maintained constantly in contact with the valve gratings. Although the covers do, in themselves, constitute a definite mass of material it is believed that the weight may be so adjusted that the pressure of the bearing surfaces upon the valve gratings will be extremely little so that the friction between the two surfaces may be reduced to a minimum. It will be readily appreciated that this will have an important advantageous effect on the operation of the valves.

In order to effect lubrication of the valves of the gas meter the sealing caps 58 on the outer ends of the tubes 54 and 55 are removed and lubricant fed into the gas meter through the tube 54. Any surplus of lubricant over that required to fill the reservoir to the level of the inner end 60 of the tube 55 will flow into that tube 55 and out through the outer downturned end 61. The fact that lubricant flows out through the end 61 is an indication that there is a sufficient level of lubricant on the reservoir. The sealing caps 58 are then replaced and sealed in position in the manner already described.

Should it be required to clean the valves of the meter the sealing caps 58 are removed from all three tubes 54, 55 and 56. The removal of the cap from the downturned outer end of the tube 56 permits the lubricant within the reservoir to drain away. The cap 58 is then replaced on the tube 56 and a suitable cleaning fluid is fed into the reservoir. The meter is caused to operate so that the cleaning fluid will be worked to completely cover the valve surfaces. When it is estimated that the valve surfaces are suitably cleansed the cleaning fluid is drained from the reservoir and replaced with clean lubricant.

In the application of my invention to a dry gas meter of open top type the construction of the majority of the parts is similar to the construction employed in the closed top type of gas meter. The inlet gas passageway 24 is of course eliminated and the construction of the valve gratings and valve covers is altered. Also the inlet gas pipe is reduced in length and the glands sealing the openings in the valve plate are not required, being replaced by simple stuffing boxes or bearings of conventional design.

Reference is now made to Figs. 9, 10 and 11 which illustrate the application of the invention to a dry gas meter of open top type. These figures also illustrate several modifications which may be conveniently incorporated in the closed top type of meter already described.

The inlet gas pipe 90 is formed with a screw threaded neck 30 adapted to engage with a nut 31 which is secured to a longitudinal bracket 91 fastened to the front and rear walls of the meter casing 11. A relatively short spacer or collar 92 is fitted about the inlet pipe 90 between the bracket 91 and the top plate 33 of the meter. The gas flows through the inlet pipe 90 directly into the upper compartment.

The valve gratings 93 are of a construction somewhat similar to that already described with reference to the closed top type of gas meter and their inner end ports 40 are in communication with the gas conduits 27. These conduits are connected to the diaphragm rims 14 and lead to the inner diaphragm chambers. The outer end ports 41 are in direct communication with the outer diaphragm chambers. The intermediate ports 42 are connected to the outlet gas passageway 25. It is to be noted that there are no inlet ports alongside the inner and outer end ports 40 and 41, respectively, with the result that the three ports 40, 41 and 42 extend transversely almost the entire width of the valve gratings 93.

Each of the valve covers 94 is formed with a bearing surface 95 which extends beyond the limits of the grating ports for all positions of the travel of the cover. Three ports, indicated by the reference numerals 96, 97 and 98, are formed in each valve cover 94 in longitudinal arrangement. The inner and outer end ports 96 and 97, respectively, are provided with upwardly extending surrounding walls 99 adapted to prevent the flow of lubricant through the said ports and the intermediate port 98 has a housing 100 through which the gas travels in transferring from either one of the end ports 40 or 41 of the valve grating 93 to the intermediate port 42. The flow of the gas from the upper compartment of the meter is through either one of the end ports 96 or 97 directly down into the respective diaphragm chamber. From the other diaphragm chamber on the same side of the division plate 13 gas flows upwardly through the other end port 97 or 96 respectively through the housing 100 over the intermediate port 98 and then down into the outlet gas passage-way 25.

The reservoir walls 53 are mounted adjacent the opposite sides of the valve grating, in the manner already described, to provide a reservoir for the retention of a suitable lubricant and these walls have means for holding the covers 94 on the valve gratings 93 as previously mentioned.

A modified means for effecting lubrication of the valves is illustrated in Figs. 9 and 10 and it comprises a single pipe 101 fitted through the front plate of the meter casing 11 and extending beneath the valve plate 12. At its inner end it is upturned and connected to an opening in the valve plate 12 whilst its outer end is formed with upwardly and downwardly extending branches 102 and 103, respectively. The top of the upward branch 102 is located at the level at which it is desired to maintain the lubricant in the reservoir, slightly above the upper surface of the valve gratings 93 and the downward branch 103 is any suitable length to permit freedom of operation. Each of the branches 102 and 103 is provided with a sealing cap 58 adapted to prevent the leakage of lubricant from the lubricating pipe 101. The two caps 58 are locked in position and sealed against tampering by means of a length of wire passed through holes formed in said caps, the ends of the wire being held together by means of a seal 104.

In order to effect economy of production the valve cover 94 for an open top type of gas meter may be made with the walls 99 about the opposite end ports and the housing 100 over the intermediate port as an integral unit designated by the numeral 105 in Fig. 11. When this is done the single unit 105 may be moulded or formed of a suitable thermosetting plastic material as phenol-formaldehyde and secured to the bearing surface 95 by means of a suitable adhesive. Alternatively, of course the single unit 105 may be made of metal and soldered or otherwise secured to the bearing surface 95. In this construction the housing 100 over the intermediate port 98 of the valve cover is relatively wide and it is believed that the gas pressure acting to lift the valve cover 94 from the valve grating 93 will nearly equalise the downward pressure of the gas in the upper compartment of the meter, with consequent reduction of the friction between the bearing surfaces of the valve cover and valve grating.

The provision of the reservoir for the lubricant ensures that the bearing surfaces of the valves will be continually lubricated and consequently there will be a considerable reduction of the friction within the meter. The lubricant will also lubricate the bearing for the crank bearing pin 79. If desired, side extensions 106 of the reservoir may be provided to direct lubricant to the glands for the side rods 18 should it be desired to lubricate those glands, see Fig. 10. The presence of the lubricant on the valve faces will, it is believed, also tend to prevent leakages of gas should the valves be caused to lift slightly by reason of any foreign matter deposited on said valve faces. The lubricant is maintained at the desired level by adding lubricant to the reservoir from time to time as inspection shows it to be necessary. During the operation of the valves, the lubricant will be gradually worked over the entire surface of the valve gratings.

The grooved rollers 62 and 81 on the side rods 18, motion wires 17 and crank pins 77 and 78 will also tend to reduce friction in the operation of those parts.

What I do claim is:

1. In a dry gas meter having a casing, a valve plate within said casing and valve gratings on the valve plate; means for reducing the friction of the operating parts including a reservoir located about the valve gratings on the valve plate, means for feeding lubricant to the reservoir from the outside of the meter casing, overflow means communicating with said reservoir and opening upwardly at one end at a predetermined level above the surface of said gratings to discharge lubricant from said reservoir to the outside of said casing when the lubricant reaches above said predetermined level whereby the level of the lubricant in the reservoir may be maintained at a suitable height to ensure that there is an adequate supply of lubricant to the bearing surfaces of the gratings, and valve covers on the valve gratings, said valve covers completely surrounding the ports in the valve gratings at all positions of the travel of the valve covers so as to prevent escape of lubricant through the grating ports.

2. In a dry gas meter, friction reducing means according to claim 1; wherein said means for feeding lubricant to said reservoir consists of a lubricating tube arranged above the reservoir of the gas meter and opening downwardly into said reservoir so as to be adapted to discharge lubricant at a suitable location to ensure a supply of lubricant to the bearing surfaces of the gratings and valve covers, and wherein said overflow means includes a level-setting tube located beneath the valve plate with its inner end projecting a suitable distance upwardly through the valve plate to said predetermined level for regulating the maximum height of lubricant within the reservoir, the outer ends of the two tubes extending through the meter casing and having sealing caps fitted thereto.

3. In a dry gas meter, friction reducing means according to claim 2; wherein a drainage tube is located beneath the valve plate with its inner end connected to an opening in the bottom of the reservoir so as to be adapted to drain lubricant from the reservoir, the outer end of said drainage tube projecting outwardly through the meter casing and having a sealing cap fitted thereto.

4. In a dry gas meter, friction reducing means according to claim 2; wherein a drainage tube is located beneath the valve plate with its outer end projecting through the meter casing and its inner end connected to an opening in the bottom of the reservoir defined by said valve plate so as to be adapted to drain lubricant from the surface of the valve plate, the outer ends of the level-setting tube and the drainage tube being downturned and the outer end of the lubricating tube being upturned, said outer ends being screw threaded, sealing caps fitted on the screw-threaded outer ends of the tubes, and means for locking and sealing said sealing caps in position on the respective outer tube ends.

5. In a dry gas meter, friction reducing means according to claim 1; wherein said means for feeding lubricant to the reservoir and for discharging lubricant reaching above said predetermined level includes a tube disposed beneath the valve plate with its inner end connected to an opening in the bottom of the reservoir, the outer end of said tube extending through the meter casing and projecting upwardly to said predetermined level of lubricant within the reservoir, and a sealing cap fitted on said outer end of the tube.

6. In a dry gas meter, friction reducing means according to claim 5, wherein said outer end of the tube has a downwardly extending branch in addition to the upwardly projecting extension thereof, said downwardly extending branch projecting below the level of the bottom of said reservoir to permit draining of the lubricant from said reservoir, and a sealing cap fitted on said downwardly extending branch of the tube.

7. In a dry gas meter, friction reducing means according to claim 1; wherein said reservoir is defined by upstanding walls secured to the upper surface of the valve plate and surrounding the valve gratings.

8. In a dry gas meter, friction reducing means according to claim 7 wherein the meter includes stiffing boxes having side rods projecting through said valve plate and wherein the reservoir is formed with extensions leading to the stuffing boxes through which the side rods project in order that those parts will be supplied with lubricant.

9. In a dry gas meter, friction reducing means according to claim 8; wherein said walls defining the reservoir have their upper edges rolled inwardly to overlie portions of said valve covers and thereby form guides to prevent lifting of the valve covers from the respective seats.

10. In a dry gas meter including a casing, a valve plate within said casing, valve gratings on said valve plate, and means for reducing the friction of the operating parts comprising a reservoir located about said valve gratings, means for feeding lubricant to said reservoir from the outside of said meter casing, overflow means communicating with said reservoir and opening upwardly at one end at a predetermined level above the upper surface of said gratings to discharge lubricant from said reservoir which reaches above said predetermined level whereby the level of the lubricant in the reservoir may be maintained at a suitable height to ensure that there is an adequate supply of lubricant to the bearing surfaces of the valves, and valve covers on said valve gratings, each of said valve covers comprising a bearing member of such size that it completely surrounds the ports of the related valve grating in all positions of the travel of the valve cover and having at least three ports therein and a housing on said bearing member covering at least the intermediate one of said three ports in the bearing member.

11. A dry gas meter according to claim 10; including diaphragm chambers and inlet and outlet gas passageways, and wherein each valve grating has three ports arranged one after the other in the direction of travel of the related valve cover, the opposite end ones of said three ports in the valve grating being connected to the diaphragm chambers and the intermediate one of said three ports of the valve grating being connected to said outlet gas passageway; each of said valve gratings further having an inlet port disposed transversely of each of said opposite end ports of the grating, the two inlet ports of each grating being connected to said inlet gas passageway of the meter; and each of said valve covers having a housing extending over each of the opposite end ones of said three ports in the bearing member of the valve cover.

12. A dry gas meter according to claim 11; wherein said housings over the opposite end ports of the valve covers are formed integrally with the housing over the intermediate port and provide a composite housing unit, and wherein the walls of the composite housing unit are of relatively thin material so that the internal length of each housing over the opposite end ports of the bearing member is greater than the length of the related port in the bearing member.

13. A dry gas meter according to claim 11; wherein said intermediate port of each valve cover is of a width equal to the width of the intermediate port of the related valve grating; and wherein each of the opposite end ports of the valve cover has a width equal to the combined widths of the related end port and the adjacent inlet port of the valve grating.

14. A dry gas meter according to claim 10; wherein each valve cover has upstanding walls attached to the upper surface of the bearing member, said upstanding walls extending about and forming upward extensions of said opposite end ports in the bearing member.

15. A dry gas meter according to claim 10; wherein said bearing member is formed of a bearing metal and said housing is formed of a plastic material and is bonded to said metal bearing member.

ROBERT NEWTON.

References Cited in the file of this patent

UNITED STATES PATENTS

| Number | Name | Date |
|---|---|---|
| 413,227 | Eddy | Oct. 22, 1889 |
| 1,261,115 | Gally | Apr. 2, 1918 |
| 1,570,214 | Fox | Jan. 19, 1926 |
| 1,668,078 | Huettig | May 1, 1928 |
| 1,737,457 | Gow | Nov. 26, 1929 |
| 1,847,524 | Dezendorf | Mar. 1, 1932 |
| 1,884,888 | Siebert et al. | Oct. 25, 1932 |
| 1,893,601 | Sprague | Jan. 10, 1933 |
| 1,952,959 | Wilson et al. | Mar. 27, 1934 |
| 1,961,299 | MacLean | June 5, 1934 |
| 2,190,411 | Mattison | Feb. 13, 1940 |
| 2,281,671 | Brown | May 5, 1942 |
| 2,301,262 | Dixon | Nov. 10, 1942 |
| 2,374,720 | Ashton | May 1, 1945 |

FOREIGN PATENTS

| Number | Country | Date |
|---|---|---|
| 24,478 | Great Britain | of 1904 |